United States Patent [19]

Hunziker

[11] 4,301,836
[45] Nov. 24, 1981

[54] HOT AND COLD WATER SANITARY MIXING SET

[75] Inventor: Werner Hunziker, Unterkulm, Switzerland

[73] Assignee: Aktiengesellschaft Karrer, Weber & Cie, Switzerland

[21] Appl. No.: 6,212

[22] Filed: Jan. 24, 1979

[30] Foreign Application Priority Data

Jan. 26, 1978 [CH] Switzerland .......................... 843/78

[51] Int. Cl.³ ...................... F16K 11/06; F16K 47/02
[52] U.S. Cl. .................. 137/625.4; 251/118; 251/127
[58] Field of Search ........................ 137/625.4, 625.41; 251/127, 118

[56] References Cited

U.S. PATENT DOCUMENTS

| 3,920,043 | 11/1975 | Fowell | 251/118 X |
| 4,157,099 | 6/1979 | Delker et al. | 137/625.4 X |
| 4,218,041 | 8/1980 | Bernat | 137/625.4 |

FOREIGN PATENT DOCUMENTS

| 1949318 | 8/1970 | Fed. Rep. of Germany ... 137/625.4 |
| 2630207 | 1/1978 | Fed. Rep. of Germany ... 137/625.4 |
| 1437280 | 5/1976 | United Kingdom ............. 137/625.4 |

Primary Examiner—Arnold Rosenthal
Attorney, Agent, or Firm—McGlew and Tuttle

[57] ABSTRACT

A hot and cold water sanitary mixing set, comprises a housing having a flow control chamber with a central outlet passage connected from the control chamber to the outside of the housing and with separate hot and cold water supply passages connected into the bottom of the control chamber. A control valve assembly is mounted in the chamber and it comprises an assembly of discs which are arranged in superposed relationship so that one or more of them is movable relative to the others under the control of a single lever which is pivotally mounted in the housing and engages the control disc assembly to move them for control of the flow. The control valve assembly comprises at least three separate superposed discs including a bottom disc having a central discharge passage which overlies the central outlet and provides a flow passage for the discharge of a mixed quantity of water therethrough. The bottom disc has separate bottom hot and cold water passages defined therethrough which are alignable over the respective hot and cold water supply passages for the passage of the respective hot and cold water therethrough. An intermediate disc has an intermediate hot and cold water passage defined therethrough and is movable relative to the bottom disc to align a selected area portion of the respective intermediate hot and cold water passages with the selected area portion of the bottom hot and cold water passages so as to control the volume of the flow therethrough. A feature of the construction is that the top disc or an associated part of the top disc defines a recess above the intermediate disc which forms a through passage for the passage of the water from the respective hot and cold inlet passages into the discharge passage. The top discs are advantageously formed with baffle means or projections to extend into the through passage so as to provide interruptions therein which reduce the flow turbulence and noise of the mixing water.

8 Claims, 6 Drawing Figures

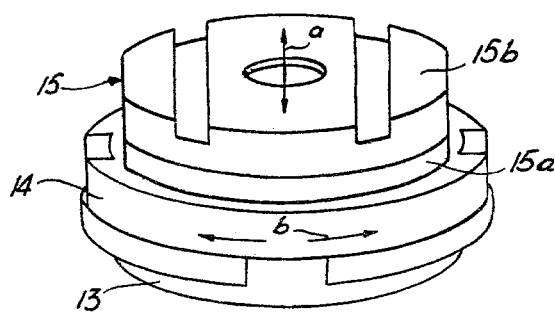
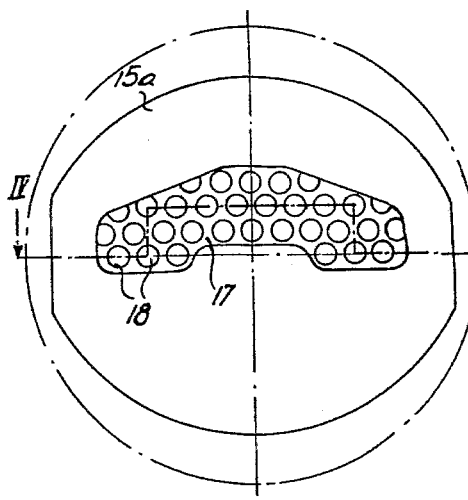
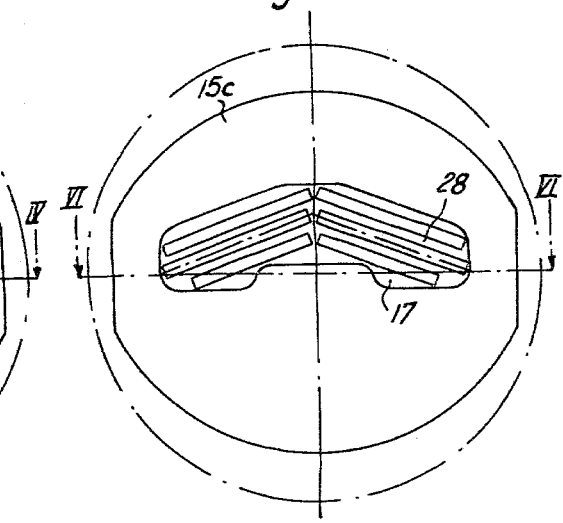
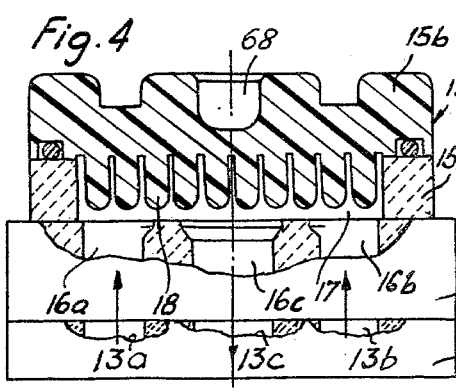
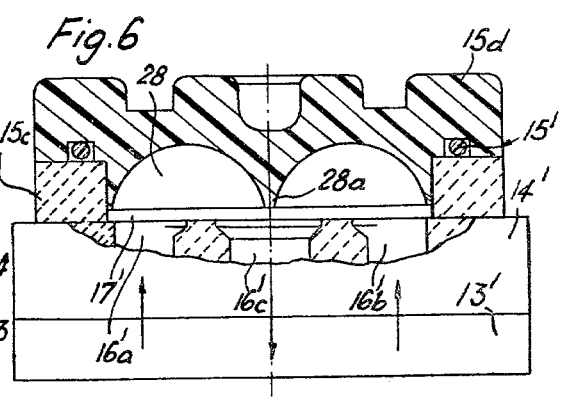

HOT AND COLD WATER SANITARY MIXING SET

FIELD AND BACKGROUND OF THE INVENTION

This invention relates to the construction of water mixers in general and, in particular, to a new and useful hot and cold single handle mixing set.

DESCRIPTION OF THE PRIOR ART

The present invention relates to a control body for sanitary single-handle mixing sets, comprising discs which are slidably movable on, and relative to one another, and whose relative position determines both the volume and the ratio of the mix. Experience has shown that it is particularly advantageous to make the control discs which are movable relative to each other and which slide on each other, tightly, due to the effect of adhesion, of a ceramic material. The axial inlet and outlet ports and the cross-channels provided in the discs movable relative to each other and connecting the ports, depending on the relative position of the discs must have sharp edges in the intersecting areas, in order to prevent dirt particles from penetrating between the discs. In practice, however, particularly during the throttling of the passages caused by the position of the discs, these sharp edges lead to cavitation effects and to an increased turbulence with the result of undesirable noise. German Patent Disclosure OS No. 23 56 327 discloses a control body of such a mixing set, which comprises a disc fixed against rotation, with a movable disc supported thereon, with the said latter disc provided with a surface channel which can be brought into alignment with inlet or outlet ports of the first disc and in which a body is accommodated having sound-absorbing properties damping the noise. This body must reduce the sound conduction to the fixed disc and, in addition, it must absorb the oscillations produced by the water-borne sound. While this may be successful to some extent, it should be noted that such a design requires a relatively large volume of the channel, since the body having the sound-absorbing properties must itself have a relatively large volume to have the screening and sound-absorbing effect at the bottom of the channel.

SUMMARY OF THE INVENTION

The disadvantages of the prior art are avoided by the present invention which does not keep the already produced acoustic oscillations away from the channel bottom and damp them in an inserted body, but instead prevents the production of such oscillations in a disturbing amount. This is done, in accordance with the invention, by providing that the top disc of a set of control discs define a through passage for interconnecting supply lines of the water with the discharge. The through passage is traversed by a plurality of projections. These projections may be designed as ribs or pins, and they produce a noise-preventing effect by subdividing the supplied water stream into a plurality of partial streams having a relatively small cross-section, which are deflected with substantially less turbulence and, therefore, noise. The surfaces of the projections which extend substantially axially to the inlet and outlet ports take over a part of the deflecting and guiding function of the channel bottom, whereby, they relieve the bottom from the water impinging thereon. In this connection, it is pointed out that the projections themselves are not intended to have any sound-absorbing properties. The projections are rigid and may be made of any suitable metal or plastic material.

It has proven to be particularly advantageous to form the control body of three superimposed ceramic discs, with a non-rotatably mounted control disc having inlet and outlet ports supporting a rotatable mixing control disc provided with corresponding mixing passages and, in turn, supporting a linearly displaceable volume control disc provided with the surface channel. By distributing the functions of the control body between a mixing plane, such as, between a bottom disc or non-rotatable disc and an intermediate disc or mixing control disc, and a volume plane, such as between a mixing control disc and a top disc or volume control disc, not only are substantial advantages obtained, for example, as to the mixing angle, the accuracy of adjustment, etc., but also the noise problem can be mastered better, since the supply streams to be deflected in the surface channel are determined by their size and direction, not only before their entry into the surface channel, but also at their entry into the axial ports of the mixing control disc, whereby, the energy proportion which might cause noise at the edges can be neutralized in the transition zone between the non-rotatable and the mixing control disc. This may be done, for example, by stepping off the port edges of the discs.

Accordingly, it is an object of the invention to provide a hot and cold water mixer which comprises a housing having a flow control chamber with a central bottom outlet passage connected from the control chamber to the outside of the housing and including a separate hot and cold water supply passage connecting into the bottom of a control chamber and, wherein, there is a control valve assembly in the control chamber which is operated by a lever control member which is pivotally mounted adjacent the top of the housing and projects into the control chamber and which includes a bottom disc having a central discharge passage overlying the central outlet for the discharge of a mixed quantity of water therethrough into the central outlet and which further includes separate bottom hot and cold water passages therethrough which are alignable over respective hot and cold water supply passages, the control valve assembly also including an intermediate disc having intermediate hot and cold water passages therethrough and being movable relative to the bottom disc to align a selected area portion of the intermediate hot and cold water passages with a selected area portion of the bottom hot and cold water passages for regulating the volume passing therethrough, the top disc having a bottom face adjacent the intermediate disc which is recessed upwardly and defines a through passage between the intermediate hot and cold water passages and the central discharge with a plurality of elements in the form of baffle means projecting into the flow channel and providing numerous flow path interruptions so as to reduce the flow turbulence and noise.

A further object of the invention is to provide a sanitary, single handed hot and cold water mixing set which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a front top perspective view of a control assembly of the mixing valve shown in FIG. 1;

FIG. 3 is a bottom plan view of the upper or top disc of the control disc assembly shown in FIG. 1;

FIG. 4 is a section taken along the line IV—IV of FIG. 3;

FIG. 5 is a view similar to FIG. 3 of another embodiment of the invention; and

FIG. 6 is a section taken along the line VI—VI of FIG. 5.

DESCRIPTION OF THE PREFERRED EMBODIMENTS

Figure 1:
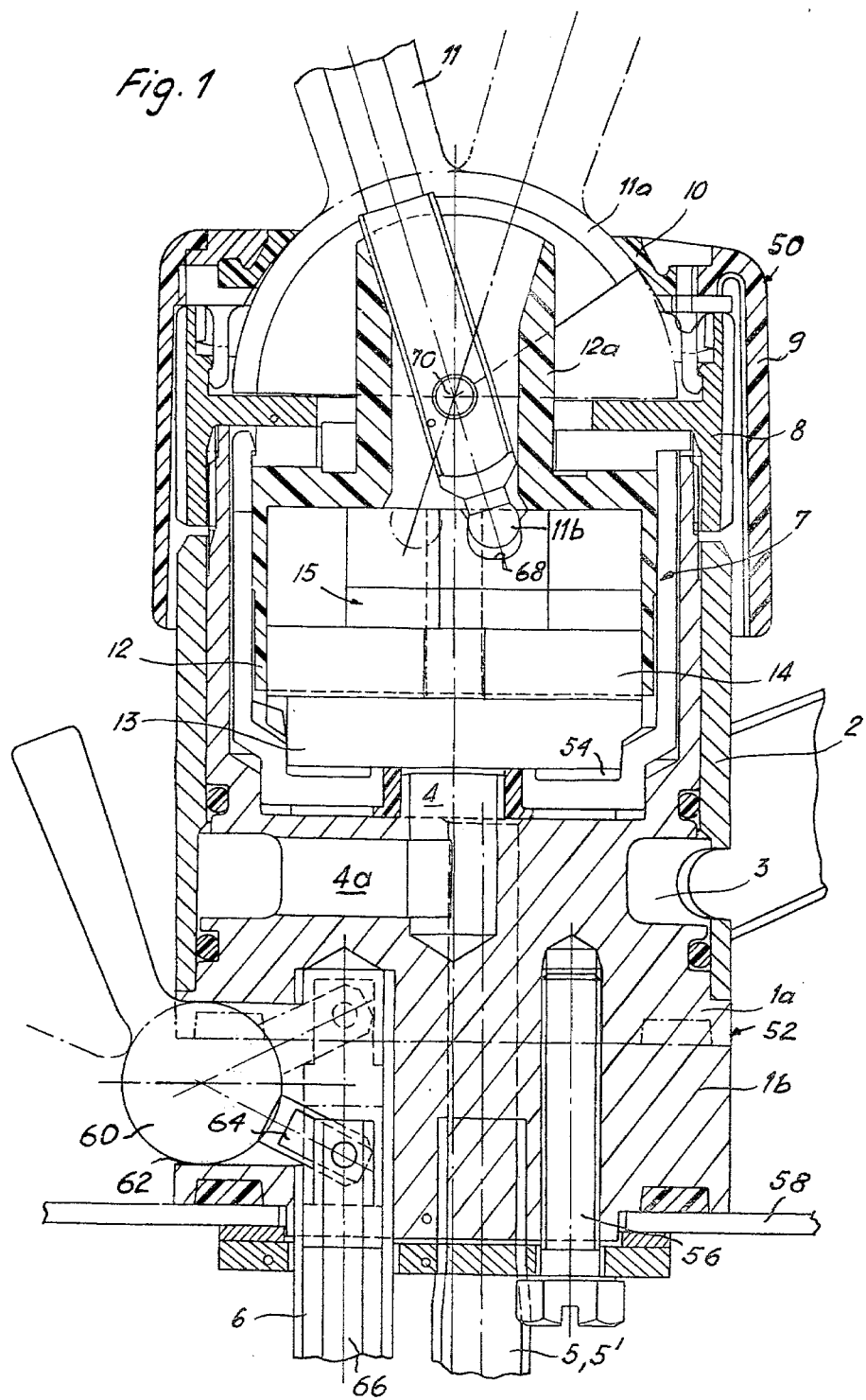
FIG. 1 is a partial axial sectional view of a mixing set for hot and cold water constructed in accordance with the invention.

Referring to the drawings in particular, the invention embodied therein in FIGS. 1 to 4, comprises, a mixer, generally designated 50, for mixing quantities of hot and cold water and for delivering these quantities through a central discharge 4 of a housing, generally designated 52, which connects from the bottom of a control chamber 54 downwardly and through a radial connecting line 4a to an annular discharge collecting area 3 and out through a discharge tube or connection 2.

In the embodiment shown, the housing 52 comprises an upper part 1a and a lower part 1b which are held together, for example, by securing bolts 56. The mixer is shown mounted on a support 58 and it includes a control lever 60 which is pivotally mounted in an opening 62 of the housing 52 and has an end portion 64 which engages with a rod member 66 located in a guide tube 6 which is shifted upwardly and downwardly for effecting a control purpose, for example, such as the opening and closing of a drain.

In accordance with the invention, a control valve assembly, generally designated 15, is located within a cartridge cap 12 which is positioned within the control chamber 54 in a position so that the assembly may be engaged by a bulbous end portion 11b which engages in a recess 68 and which is carried on a lever 11 which is pivotally mounted for pivotal movement about a pivot 70 in the cartridge cap 12. The actuating lever 11 includes a spherical shell 11a which is sealed around a portion of its periphery by an annular lip seal 10 which is carried in a cover cap 9 which forms a part of a nut 8. A cartridge cap 12, together with the valve assembly 15, forms a control cartridge 7 for controlling the operation of the hot and cold water mixer.

In accordance with the invention, the control disc assembly or top disc 15 includes a bottom disc 13 which is advantageously made non-rotatable and which supports an intermediate or underlying disc 14. In addition, a top disc 15 acts as a volume control disc and all of the discs 13, 14 and 15 are advantageously made of a ceramic material, at least in part.

In accordance with the invention, hot and cold water lines 5 and 5' located one behind the other, as shown in FIG. 1, connect upwardly into the housing through the parts 1b and 1a and into the control chamber 54. The bottom disc 13 overlies the connections and it is provided with continuation passages 13a and 13b for the hot and cold water from the lines 5 and 5', respectively. The underlying or intermediate disc 14 is also provided with passages 16a and 16b which may be selectively aligned with a predetermined area of the associated passages 13a and 13b of the disc 13 and selected areas of the passages 16a and 16b in order to regulate the volume by regulation at a volume regulation plane between the discs 13 and 14. This regulation is carried out by relative rotation between discs 13 and 14 which is effected by control lever 11.

In accordance with a special feature of the invention, a separate control of the hot and cold water is effected between the top disc 15 and the intermediate disc 14 and, for this purpose, control disc 15 is provided with a recess on its face facing the disc 14 which defines a through flow channel or cross-channel 17 which provides a connection between inlets 16a and 16b for the hot and cold water and for the discharge 16c for the combined water flow which connects to the discharge passage 4 and outlet 2.

The control disc 15, as shown in FIGS. 3 and 4, comprises an annular disc part 15a which is sealed with a cover disc part 15b and which closes the top of the cross-channel 17. The cover disc part 15b covers the central recess 68 which receives the spherical head 11b of the lever 11. By means of lever 11, volume control disc 15 is movable linearly on the mixing control disc 14 from its righthand end position, shown in FIG. 1, into the lefthand end position, as shown in dotted lines in FIG. 1, which corresponds to the transverse or cross displacement indicated in FIG. 2 by the arrows a. This displacement controls the water volume by changing the areas which communicate between the hot and cold water passages of the two discs 13 and 14.

Control disc 14 is rotatable to a limited extent by means of the lever 11 acting through the cartridge cap 12 which is connected to the disc 14 so that the disc 14 is rotatable about the axis of the control disc assembly 15. This rotary motion controls the mixing of the hot and cold water or the temperature of the resultant water which is discharged from discharge 4.

As shown in FIGS. 3 and 4, in accordance with the invention, the through channel 17 is provided with a plurality of axially parallel pins 18 which project from the bottom of the top disc portion 15b into the cross-channel 17 by a distance which in the example shown is greater than the diameter of the pins 18. Pins 18 have a circular cross-section and their rounded free end is slightly spaced in the upward direction from the contact plane of the discs 14 and 15a. By means of pins 18, which interrupt the cross-section of the channel at a plurality of locations extending parallel to the plane between the two discs, the cross-channel is sub-divided in the zone of penetration of the pins into a plurality of relatively narrow channels. This results in a corresponding splitting of the water streams passing through the ports 16a and 16b of the control disc 14 immediately after their entry and forms them into a plurality of recticularly connected individual streams.

Due to the guiding effect of the cross-channel bottom and the pins 18, the streams are first deflected in the horizontal direction and then pass axially into the central outlet port 16c of the control disc 14. Since no sufficiently large space is left in the cross-channel 17 adjacent the disturbance area of the inflowing water streams produced by the intersection of the port edges of the two discs 14 and 15a, breaks in laminar flow cannot lead to noise-producing turbulances and eddies.

In addition, due to the sectioning of the channel 17 by the pins 18, it is ensured that only relatively small stream portions impinge against the bottom of the cross-channel 17 so that this usual source of noise is virtually eliminated. Further, due to the parting of the total flow throttling which occurs in the control body into two axially spaced planes, namely, the mixing plane between discs 13 and 14 and the volume plane between the discs 14 and 15, the flow velocity of the incoming water streams in the transition zone into the cross-channel is reduced, as compared to an embodiment with only two control discs, which represents an additional reduction of the noise.

In this connection, it should be noted that even in an embodiment of the control body with only two relatively movable discs for a simultaneous control of the mixture and the volume, the otherwise unavoidable noise production is quite considerably reduced by the projections extending into the cross-channel in a described manner. Instead of being cylindrical, the pins 18 may also be conical or have an oval or drop-like cross-section. In any case, what is substantial is the sectioning of the cross-channel into relatively narrow partial channels and the creation of guide surfaces facilitating the guidance and deflection of the partial streams.

In the embodiment of FIGS. 5 and 6 in which the control body is assembled in the same manner as in the above example of control discs 13', 14', and 15', the ceramic disc 15c is associated with a plastic disc 15d forming the bottom of cross-chennel 17'. In each of the two branches of the cross-channel, extending under an obtuse angle from the center zone to both sides, a group of parallel ribs 28 projects from the channel bottom into cross-channel 17. The free edges of the ribs extend parallel to the disc plane and are spaced from the contact plane of the two discs 14, 15c by a small distance, so that the cross-channel is sectioned over the major part of its height, into a corresponding number of relatively narrow partial channels.

The channel bottom area of the two channel branches remaining between the ribs 26 of each group has a concave shape so that a central rib 28a is formed between the two channel branches extending in the zone of the central outlet port 16c. The concave shape of the channel bottom from the inlets to the outlet along with the presence of ribs 28 results in an optimal deflection of the partial streams so that, in practice, turbulence which would cause undesirable noise cannot occur. Here again, the distribution of the control function between axially separated mixing and volume plane at the ports of disc 14 leads to reduced flow velocities, whereby, the possibility of noise-producing breakoff and turbulence phenomena at the intersecting port edges of discs 14 and 15a is also reduced. The other conditions are the same as in the embodiment of FIGS. 3 and 4.

Experience has shown in all instances that, due to the described arrangement and design of projections in the cross-channel, the noise-producing flow conditions themselves, i.e., strong turbulences and unimpeded impingement of compact water streams on large-surface channel bottom portions are eliminated, so that there is no need for a subsequent damping of the noise by bodies having sound-absorbing properties and/or dissipating the kinetic energy of the flow and provided upstream of the channel bottom.

It should be noted that it is not absolutely necesary to make the projections in the cross-channel integral with the plastic disc 15b or 15d, as in the described embodiments. For reasons of manufacture, it may be preferable to provide these projections in an insert clamped between the two discs 14 and 15a or 15c connected to each other. While specific embodiments of the invention have been shown and described in detail to illustrate the applicaton of the principles of the invention, it will be understood that the invention may be embodied otherwise without departing from such principles.

What is claimed is:

1. A control body for sanitary single handle mixing sets, for mixing hot and cold water, comprising, a housing having an outlet and a control chamber connected to said outlet, a top and intermediate disc in said control chamber which are relatively slidably movable in respect to each other and whose position relative to each other and to said housing is determinative for both the volume and ratio of the mixture of the hot and cold water, said housing having a separate hot and cold water passage, said intermediate disc having intermediate hot and cold water passages which are alignable up to selected flow areas with said hot and cold water passages of said housing, with said top disc being provided with a surface channel through which separate hot and cold water passages of the underlying intermediate disc are connectable to said outlet, and wherein, said top and intermediate discs define a cross-flow channel therebetween having projections extending into said cross-flow channel from the bottom of said top disc up to a part of the total height of said channel and, transversely, to the flow direction, so as to provide numerous flow interruptions in said channel, said intermediate disc and an adjacnet disc portion of said top disc being made of ceramic material, said top disc including an uppermost disc portion with said adjacent disc portion being between said uppermost disc portion and said intermediate disc, said uppermost disc portion being made of a plastic material and defining the bottom of said cross-flow channel.

2. A control body, as claimed in claim 1, wherein said pins have smooth outer surfaces and a rounded cross-section.

3. A control body, as claimed in claim 1, wherein said projections comprise ribs which extend in the main flow direction in the cross-channel and have smooth outer surfaces.

4. A control body, as claimed in claim 1, wherein said projections terminate at a small distance from the plane of mutual contact of said top and intermediate discs.

5. A control body as claimed in claim 1, including a bottom disc mounted in said chamber against rotation in respect to said housing having respective hot and cold water passages overlying said housing hot and cold water passages over which said intermediate disc is movable, said intermediate disc and said bottom disc passages for the hot and cold water being regulated in respect to area by alignment of the passages by rotation of said intermediate disc relative to said bottom disc.

6. A control body, as claimed in claim 1, wherein said cross-flow channel includes two branches united at an obtuse angle and extending in a direction of extension of the channel branches transverse to an extension of said intermediate hot and cold water passages.

7. A control body, as claimed in claim 1, wherein said projections form a part of said uppermost disc portion.

8. A control body, as claimed in claim 1, including a cartridge cap in said housing connected to said intermediate disc, a control lever mounted on said cartridge cap and being movable to rotate said cartridge cap with said intermediate disc to change the position of said intermediate disc in respect to the hot and cold water passages, said cartridge cap including a cylindrical portion in said control chamber of said housing surrounding said top and intermediate discs, and a tubular portion extending upwardly in said housing, said lever being pivoted to said tubular portion of said cartridge cap and having a spherical skirt portion overlying said cartridge cap, said housing having a sealing lip engaged with said spherical skirt portion.

* * * * *